(12) United States Patent  
Burch et al.

(10) Patent No.: US 8,151,324 B2  
(45) Date of Patent: Apr. 3, 2012

(54) REMOTABLE INFORMATION CARDS

(76) Inventors: Lloyd Leon Burch, Payson, UT (US); Daniel S. Sanders, Orem, UT (US); Andrew A. Hodgkinson, Pleasant Grove, UT (US); Stephen R. Carter, Spanish Fork, UT (US)

(*) Notice: Subject to any disclaimer, the term of this patent is extended or adjusted under 35 U.S.C. 154(b) by 980 days.

(21) Appl. No.: 12/111,874

(22) Filed: Apr. 29, 2008

(65) Prior Publication Data

US 2009/0328166 A1 Dec. 31, 2009

Related U.S. Application Data

(63) Continuation-in-part of application No. 11/843,572, filed on Aug. 22, 2007, now Pat. No. 8,073,783, and a continuation-in-part of application No. 11/843,638, filed on Aug. 22, 2007, and a continuation-in-part of application No. 11/843,640, filed on Aug. 22, 2007, now Pat. No. 8,074,257, and a continuation-in-part of application No. 12/019,104, filed on Jan. 24, 2008, and a continuation-in-part of application No. 12/029,373, filed on Feb. 11, 2008.

(60) Provisional application No. 60/895,312, filed on Mar. 16, 2007, provisional application No. 60/895,316, filed on Mar. 16, 2007, provisional application No. 60/895,325, filed on Mar. 16, 2007, provisional application No. 60/973,679, filed on Sep. 19, 2007.

(51) Int. Cl.  
*H04L 29/06* (2006.01)

(52) U.S. Cl. ............. 726/4; 726/2; 726/3; 726/5; 726/6; 726/7; 713/168; 713/169; 713/172; 713/182; 713/185; 709/225; 709/229

(58) Field of Classification Search ................. 726/2–10; 713/168–172, 182–186; 709/223–229  
See application file for complete search history.

(56) References Cited

U.S. PATENT DOCUMENTS

| 4,153,931 A | 5/1979 | Green et al. |
| 5,073,950 A | 12/1991 | Colbert et al. |

(Continued)

FOREIGN PATENT DOCUMENTS

EP 0917120 5/1999

(Continued)

OTHER PUBLICATIONS

A Guide to Supporting Information Cards within Web Applications and Browsers as of the Information Card Profile V1.0 by Michael Jones; Publisher: Microsoft; Date: Dec. 2006.*

(Continued)

*Primary Examiner* — Taghi Arani  
*Assistant Examiner* — Madhuri Herzog  
(74) *Attorney, Agent, or Firm* — Marger Johnson & McCollom PC

(57) ABSTRACT

An accessor function interfaces among a client, a relying party, and an identity provider. The identity provider can "manage" personal (i.e., self-asserted) information cards on behalf of a user, making the personal information cards available on clients on which the personal information cards are not installed. The client can be an untrusted client, vulnerable to attacks such as key logging, screen capture, and memory interrogation. The accessor function can also asked as a proxy for the relying party in terms of invoking and using the information cards system, for use with legacy relying parties.

22 Claims, 11 Drawing Sheets

U.S. PATENT DOCUMENTS

| | | | |
|---|---|---|---|
| 5,485,510 A | 1/1996 | Colbert | |
| 5,546,471 A | 8/1996 | Merjanian | |
| 5,546,523 A | 8/1996 | Gatto | |
| 5,594,806 A | 1/1997 | Colbert | |
| 5,613,012 A | 3/1997 | Hoffman et al. | |
| 5,848,412 A | 12/1998 | Rowland et al. | |
| 6,028,950 A | 2/2000 | Merjanian | |
| 6,055,595 A | 4/2000 | Tachibana et al. | |
| 6,327,578 B1 | 12/2001 | Linehan | |
| 6,363,488 B1 | 3/2002 | Ginter et al. | |
| 6,481,621 B1 | 11/2002 | Herrendoerfer et al. | |
| 6,513,721 B1 | 2/2003 | Salmre et al. | |
| 6,612,488 B2 | 9/2003 | Suzuki | |
| 6,721,713 B1 | 4/2004 | Guheen et al. | |
| 6,880,155 B2 | 4/2005 | Schwabe et al. | |
| 6,913,194 B2 | 7/2005 | Suzuki | |
| 6,970,836 B1 | 11/2005 | Paltenghe et al. | |
| 7,003,501 B2 | 2/2006 | Ostroff | |
| 7,103,575 B1 | 9/2006 | Linehan | |
| 7,104,444 B2 | 9/2006 | Suzuki | |
| 7,210,620 B2 | 5/2007 | Jones | |
| 7,225,156 B2 | 5/2007 | Fisher et al. | |
| 7,231,369 B2 | 6/2007 | Hirabayashi | |
| 7,353,532 B2 | 4/2008 | Duri et al. | |
| 7,360,237 B2 | 4/2008 | Engle et al. | |
| 7,416,486 B2 | 8/2008 | Walker et al. | |
| 7,444,519 B2 | 10/2008 | Laferriere et al. | |
| 7,487,920 B2 | 2/2009 | Sato et al. | |
| 7,494,416 B2 | 2/2009 | Walker et al. | |
| 7,500,607 B2 | 3/2009 | Williams | |
| 7,529,698 B2 | 5/2009 | Joao | |
| 7,537,152 B2 | 5/2009 | Chakiris et al. | |
| RE40,753 E | 6/2009 | Wang et al. | |
| 7,555,460 B1 | 6/2009 | Barkan | |
| 7,565,329 B2 | 7/2009 | Lapsley et al. | |
| 7,591,424 B2 | 9/2009 | Wang et al. | |
| 7,594,258 B2 | 9/2009 | Mao et al. | |
| 7,610,040 B2 | 10/2009 | Cantini et al. | |
| 7,613,659 B1 | 11/2009 | Hoffman et al. | |
| 7,620,177 B2 | 11/2009 | Ibrahim et al. | |
| 7,636,941 B2 | 12/2009 | Blinn et al. | |
| 7,661,585 B2 | 2/2010 | Joao | |
| 7,664,022 B2 | 2/2010 | Hu | |
| 7,747,540 B2 | 6/2010 | Cameron et al. | |
| 7,771,273 B2 | 8/2010 | Walker et al. | |
| 7,788,499 B2 | 8/2010 | Cameron et al. | |
| 7,797,434 B2 | 9/2010 | Blakley et al. | |
| 7,831,522 B1 | 11/2010 | Satish et al. | |
| 7,860,883 B2 | 12/2010 | Hinton et al. | |
| 2001/0007983 A1 | 7/2001 | Lee | |
| 2002/0026397 A1 | 2/2002 | Ieta et al. | |
| 2002/0029337 A1 | 3/2002 | Sudia et al. | |
| 2002/0029342 A1 | 3/2002 | Keech | |
| 2002/0046041 A1 | 4/2002 | Lang | |
| 2002/0095360 A1 | 7/2002 | Joao | |
| 2002/0103801 A1 | 8/2002 | Lyons | |
| 2002/0116647 A1 | 8/2002 | Mont et al. | |
| 2002/0178370 A1 | 11/2002 | Gurevich et al. | |
| 2003/0061170 A1 | 3/2003 | Uzo | |
| 2003/0126094 A1 | 7/2003 | Fisher et al. | |
| 2003/0158960 A1 | 8/2003 | Engberg | |
| 2003/0172090 A1 | 9/2003 | Asunmaa et al. | |
| 2003/0217140 A1 | 11/2003 | Burbeck et al. | |
| 2003/0218062 A1 | 11/2003 | Noriega et al. | |
| 2004/0019571 A1 | 1/2004 | Hurwitz et al. | |
| 2004/0128392 A1 | 7/2004 | Blakley et al. | |
| 2004/0162786 A1 | 8/2004 | Cross et al. | |
| 2004/0199475 A1 | 10/2004 | Rivest et al. | |
| 2004/0199787 A1 | 10/2004 | Hans et al. | |
| 2004/0230831 A1 | 11/2004 | Spelman et al. | |
| 2005/0033692 A1 | 2/2005 | Jarman et al. | |
| 2005/0091543 A1 | 4/2005 | Holtzman et al. | |
| 2005/0097550 A1 | 5/2005 | Schwabe et al. | |
| 2005/0124320 A1 | 6/2005 | Ernst et al. | |
| 2005/0135240 A1 | 6/2005 | Ozugur | |
| 2005/0229005 A1 | 10/2005 | Le Saint et al. | |
| 2005/0247777 A1 | 11/2005 | Pitroda | |
| 2005/0247797 A1 | 11/2005 | Ramachandran | |
| 2005/0289080 A1 | 12/2005 | Rhiando | |
| 2006/0020679 A1* | 1/2006 | Hinton et al. | 709/217 |
| 2006/0136990 A1 | 6/2006 | Hinton et al. | |
| 2006/0155993 A1* | 7/2006 | Busboon | 713/169 |
| 2006/0200424 A1 | 9/2006 | Cameron et al. | |
| 2006/0206931 A1 | 9/2006 | Dillaway et al. | |
| 2006/0224611 A1 | 10/2006 | Dunn et al. | |
| 2006/0235796 A1 | 10/2006 | Johnson et al. | |
| 2007/0016484 A1 | 1/2007 | Waters et al. | |
| 2007/0016943 A1 | 1/2007 | M'Raihi et al. | |
| 2007/0043651 A1 | 2/2007 | Xiao et al. | |
| 2007/0061567 A1 | 3/2007 | Day et al. | |
| 2007/0118449 A1 | 5/2007 | De La Motte | |
| 2007/0143835 A1 | 6/2007 | Cameron et al. | |
| 2007/0192245 A1 | 8/2007 | Fisher et al. | |
| 2007/0203852 A1 | 8/2007 | Cameron et al. | |
| 2007/0204168 A1* | 8/2007 | Cameron et al. | 713/185 |
| 2007/0204325 A1 | 8/2007 | Cameron et al. | |
| 2007/0208869 A1 | 9/2007 | Adelman et al. | |
| 2007/0214429 A1 | 9/2007 | Lyudovyk et al. | |
| 2007/0282951 A1 | 12/2007 | Selimis et al. | |
| 2007/0294431 A1 | 12/2007 | Adelman et al. | |
| 2008/0003977 A1 | 1/2008 | Chakiris et al. | |
| 2008/0010675 A1 | 1/2008 | Massascusa et al. | |
| 2008/0071808 A1 | 3/2008 | Hardt et al. | |
| 2008/0098228 A1 | 4/2008 | Anderson et al. | |
| 2008/0140576 A1 | 6/2008 | Lewis et al. | |
| 2008/0141339 A1* | 6/2008 | Gomez et al. | 726/1 |
| 2008/0141366 A1 | 6/2008 | Cross et al. | |
| 2008/0162297 A1 | 7/2008 | Hershkovitz et al. | |
| 2008/0178271 A1 | 7/2008 | Gajjala et al. | |
| 2008/0178272 A1 | 7/2008 | Gajjala et al. | |
| 2008/0184339 A1* | 7/2008 | Shewchuk et al. | 726/3 |
| 2008/0189778 A1 | 8/2008 | Rowley | |
| 2008/0196096 A1 | 8/2008 | Grynberg | |
| 2008/0222714 A1 | 9/2008 | Wahl | |
| 2008/0229410 A1 | 9/2008 | Felsted et al. | |
| 2008/0235144 A1 | 9/2008 | Phillips | |
| 2008/0244722 A1 | 10/2008 | Satish et al. | |
| 2008/0256594 A1 | 10/2008 | Satish et al. | |
| 2008/0263644 A1 | 10/2008 | Grinstein | |
| 2008/0313567 A1 | 12/2008 | Sabin et al. | |
| 2009/0037920 A1 | 2/2009 | Brown et al. | |
| 2009/0077118 A1 | 3/2009 | Doman et al. | |
| 2009/0077627 A1 | 3/2009 | Doman et al. | |
| 2009/0089625 A1 | 4/2009 | Kannappan et al. | |
| 2009/0089870 A1* | 4/2009 | Wahl | 726/9 |
| 2009/0089871 A1 | 4/2009 | Murphy et al. | |
| 2009/0099860 A1 | 4/2009 | Karabulut et al. | |
| 2009/0125558 A1 | 5/2009 | Suh | |
| 2009/0138398 A1 | 5/2009 | Cole et al. | |
| 2009/0178112 A1 | 7/2009 | Doman et al. | |
| 2009/0186701 A1 | 7/2009 | Rowe et al. | |
| 2009/0204622 A1 | 8/2009 | Sanders et al. | |
| 2009/0205014 A1 | 8/2009 | Doman et al. | |
| 2009/0205035 A1 | 8/2009 | Sermersheim et al. | |
| 2009/0216666 A1 | 8/2009 | Antao et al. | |
| 2009/0241178 A1 | 9/2009 | Burch et al. | |
| 2009/0249430 A1 | 10/2009 | Buss et al. | |
| 2009/0254476 A1 | 10/2009 | Sharma et al. | |
| 2009/0254483 A1 | 10/2009 | Barkan | |
| 2009/0260064 A1 | 10/2009 | McDowell et al. | |
| 2009/0300512 A1 | 12/2009 | Ahn | |
| 2009/0300747 A1 | 12/2009 | Ahn | |
| 2009/0320095 A1 | 12/2009 | Nanda et al. | |
| 2009/0328166 A1 | 12/2009 | Burch et al. | |
| 2010/0037303 A1 | 2/2010 | Sharif et al. | |
| 2010/0274691 A1 | 10/2010 | Hammad et al. | |
| 2011/0023103 A1 | 1/2011 | Dietrich et al. | |

FOREIGN PATENT DOCUMENTS

| | | |
|---|---|---|
| JP | 11003382 | 1/1999 |
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Computer Security Institute; "What InfoCard Is and Isn't"; http://web.archive.org/web/20060423133805/http:/www.identityblog.com/wp-content/resources/alert.pdf, May 2006 (4 pages).

Cameron, Kim et al; "Design Rationale behind the Identity Metasystem Architecture"; http://www.identityblog.com/, http://research.microsoft.com/~mbj/; Mar. 16, 2006, pp. 1-11.

Hoang et al.; "Secure Roaming with Identity Metasystems"; ACM 978-1-60558-006-1; http://portal.acm.org/citation.cfm?id=1373297; 2008, pp. 36-47.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft+age+STS+RP&hl=en&ct=clnk& cd=2& gl=us&client=fire.fox-a; MSDN Blogs; 2007, pp. 1-7.

"Identity Selector Interoperability Profile specification and companion guides"; Microsoft Download Center; http://www.microsoft.com/downloads/details.aspx?DisplayLang=en& FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/down load/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1d31855cd2/Identity-Selector-Interop-Profile-v1-Guide.pdf; Microsoft.Corporation; Apr. 2007, pp. 1-74.

Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5,2005; Chapter 8, pp. 147-160.

"PwdHash From Stanford—Generate Passwords by Hashing the URL"; Don't Learn to HACK—Hack to LEARN, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb.20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1&article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 25, 2005), "A Guide to Integrating with InfoCard v1.0", XP007908505, pp. 1-62.

Gralla, Preston; "How the Internet Works"; Millennium Ed. Que, Aug. 1999.

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part I)", Internet Article, http://www.codeproject.com/KB/scripting/DragDrip_Part_1_.aspx, Jun. 11, 2006 (12 pages).

Alrodhan, et al., "Addressing privacy issues in CardSpace", 2007, IEEE, pp. 285-291.

Chappell, Introducing Windows CardSpace:, Windows Vista Technical Articles, http://msdn2.microsoft.com/en-us/library/aa480189.aspx, Apr. 2006, pp. 1-13.

The Eclipse Foundation, "Higgins FAQ", http://www.eclipse.org/higgins/faq.php, 2007, pp. 1-2.

"Components—Eclipsepedia", http:/wiki.eclipse.org/index.php/Architecture, 2007, pp. 1-2.

"Architecture—Eclipsepedia", http://wiki.eclipse.org/index.php/Architecture, 2007, pp. 1-2.

U.S. Appl. No. 11/395,725, filed Mar. 31, 2006 entitled "Methods and Systems for Multifactor Authentication." This is a commonly owned application that is in the same general field as the invention.

* cited by examiner

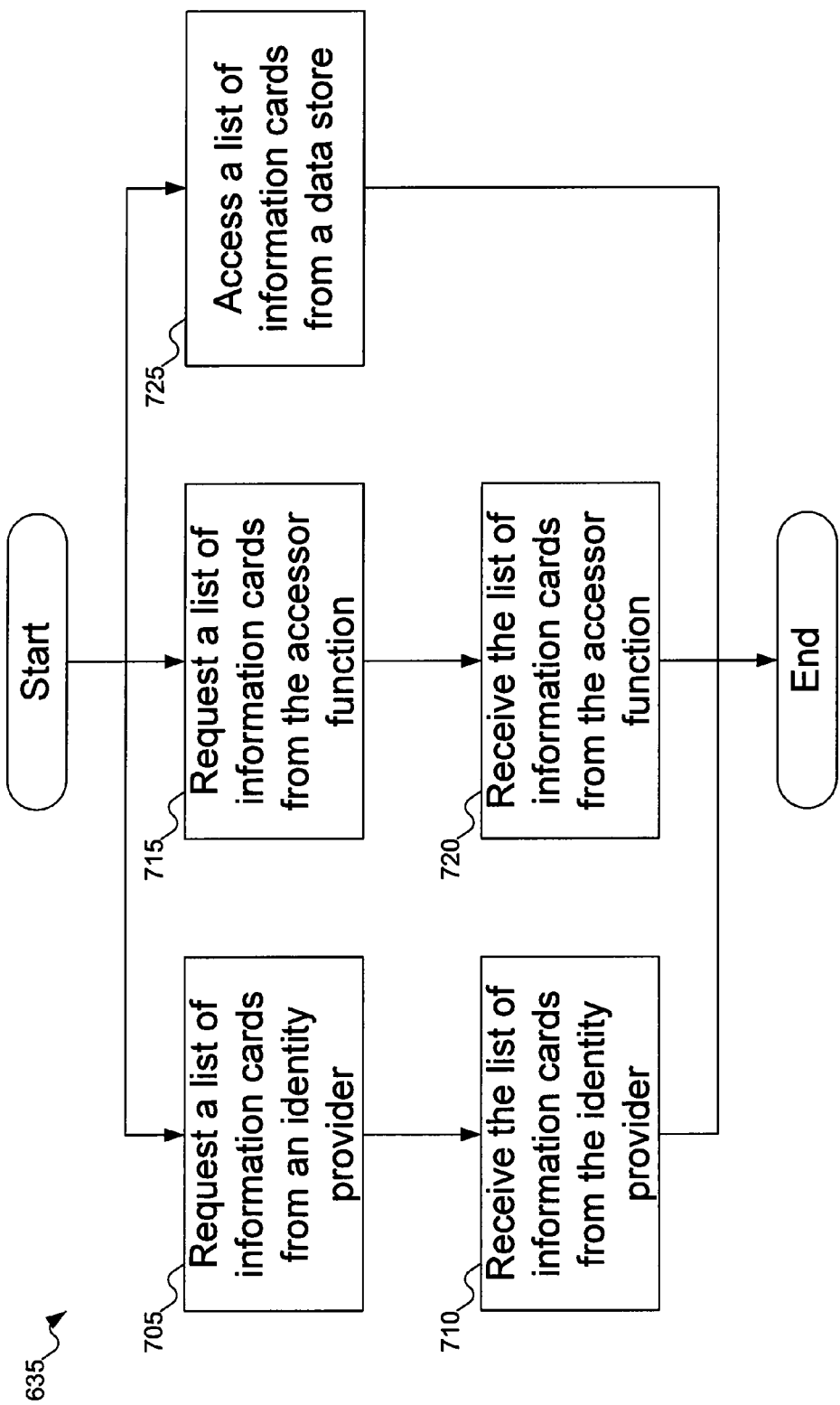

REMOTABLE INFORMATION CARDS

RELATED APPLICATION DATA

This application is a continuation-in-part of co-pending U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, of co-pending U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, and of co-pending U.S. patent application Ser. No. 11/843,640, titled "FRAMEWORK AND TECHNOLOGY TO ENABLE THE PORTABILITY OF INFORMATION CARDS", filed Aug. 22, 2007, all of which are herein incorporated by reference for all purposes. Co-pending U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, co-pending U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, and co-pending U.S. patent application Ser. No 11/843,640, titled "FRAMEWORK AND TECHNOLOGY TO ENABLE THE PORTABILITY OF INFORMATION CARDS", filed Aug. 22, 2007, all claim the benefit of U.S. Provisional Patent Application Ser. No. 60/895,312, filed Mar. 16, 2007, U.S. Provisional Patent Application Ser. No. 60/895,316, filed Mar. 16, 2007, and U.S. Provisional Patent Application Ser. No. 60/895,325, filed Mar. 16, 2007, all of which are herein incorporated by reference for all purposes.

This application is also a continuation-in-part of co-pending U.S. patent application Ser. No. 12/019,104, titled "PROCESSING HTML EXTENSIONS TO ENABLE SUPPORT OF INFORMATION CARDS BY A RELYING PARTY", filed Jan. 24, 2008, which claims the benefit of U.S. Provisional Patent Application Ser. No. 60/973,679, filed Sep. 19, 2007, both of which are herein incorporated by reference for all purposes.

This application is also a continuation-in-part of co-pending U.S. patent application Ser. No. 12/029,373, filed Feb. 11, 2008, which is herein incorporated by reference for all purposes.

FIELD OF THE INVENTION

This invention pertains to using information cards, and more particularly to being able use information cards with an untrusted client.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

While this system simplifies the management of information used to satisfy the requests of service providers, there are potential problems. This system assumes that a client machine is trustworthy. But if the client machine is not trustworthy—if the client might be subject to attacks of different natures—it would be dangerous for a user to use the client with the system. The various attacks to which the client might be subjected might lead to the user involuntarily revealing secret information, which could then be used against the user at a later time.

A need remains for a way to addresses these and other problems associated with the prior art.

SUMMARY OF THE INVENTION

In an embodiment of the invention, an untrusted client can engage in a transaction with a relying party. An accessor function acts as an intermediary between the untrusted client and the relying party. The accessor function can invoke the card selector on the untrusted client and act as a pathway through which all sensitive information flows to the relying party. Personal information cards, which normally would be stored directly on the client, can be "managed" on behalf of the user by an identity provider.

In another embodiment of the invention, the accessor function can determine that the relying party can use data stored in an information card, but that the relying party is itself not capable of using the information card system. The accessor function can then invoke the information card system on behalf of this legacy relying party, utilizing data from the information cards in a manner that mimics how the legacy relying party might use the data if the legacy relying party were able to use the information card system.

The foregoing and other features, objects, and advantages of the invention will become more readily apparent from the following detailed description, which proceeds with reference to the accompanying drawings.

BRIEF DESCRIPTION OF THE DRAWINGS

FIG. 7 shows a flowchart of a procedure for the clients of FIG. 2 can construct a list of information cards available for use at the client.

DETAILED DESCRIPTION OF THE PREFERRED EMBODIMENT

Figure 1:
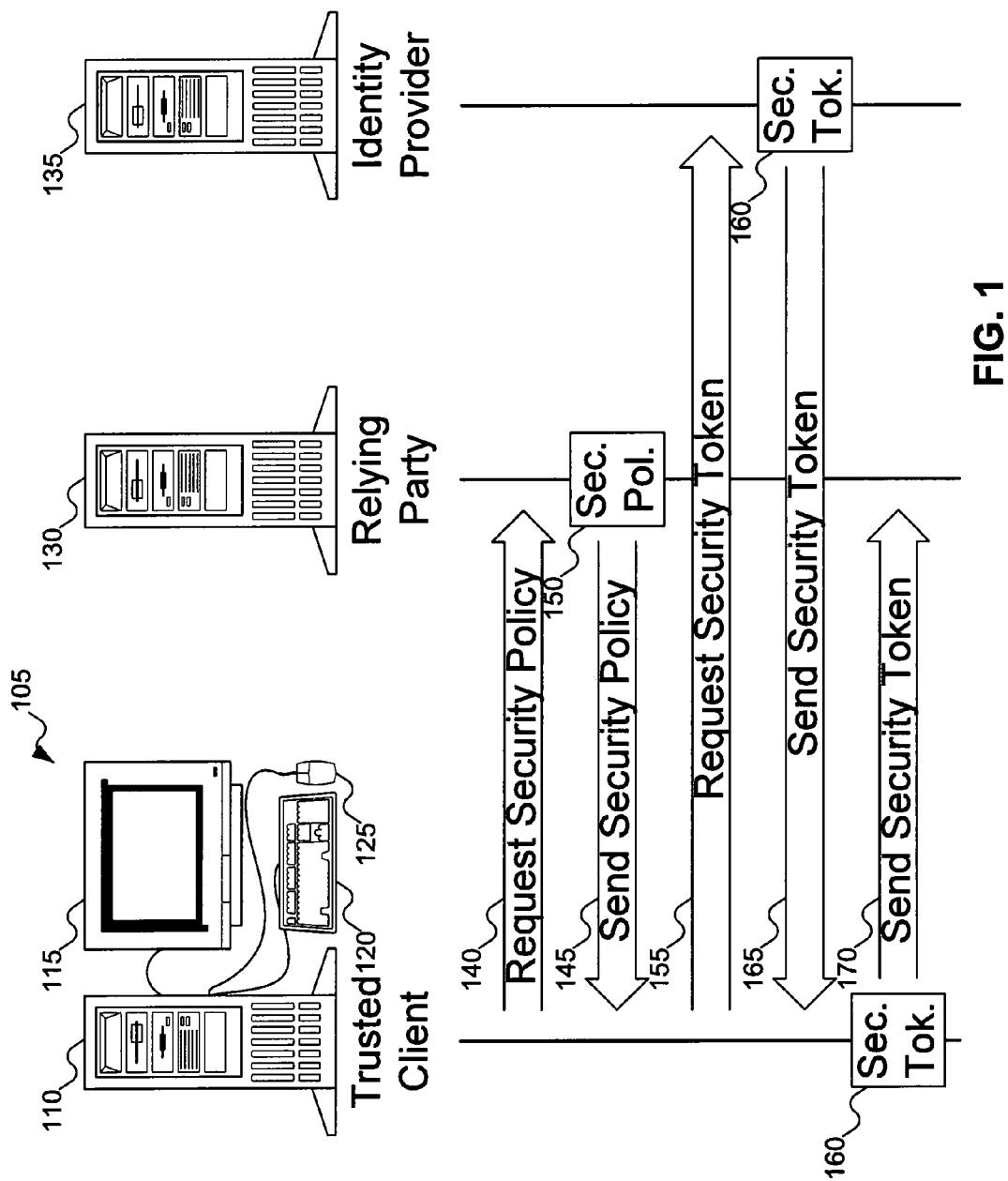
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) can be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105: for example, a central processing unit, memory, storage, etc. Although not shown in FIG. 1, a person skilled in the art will recognize that computer system 105 can interact with other computer systems, such as relying party 130 and identity provider 135, either directly or over a network (not shown in FIG. 1) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web at http://msdn2.microsoft.com/en-us/library/aa480189.aspx and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a user's e-mail address, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that there is an implicit assumption that client 105 is trustworthy. More specifically, there is an implicit assumption that client 105 is not subject to attacks that might result in sensitive information of the user being captured by a third party. When this assumption is removed—that is, when client 105 is potentially subject to attacks that could leak sensitive information—the problem with this model becomes apparent.

Figure 2:
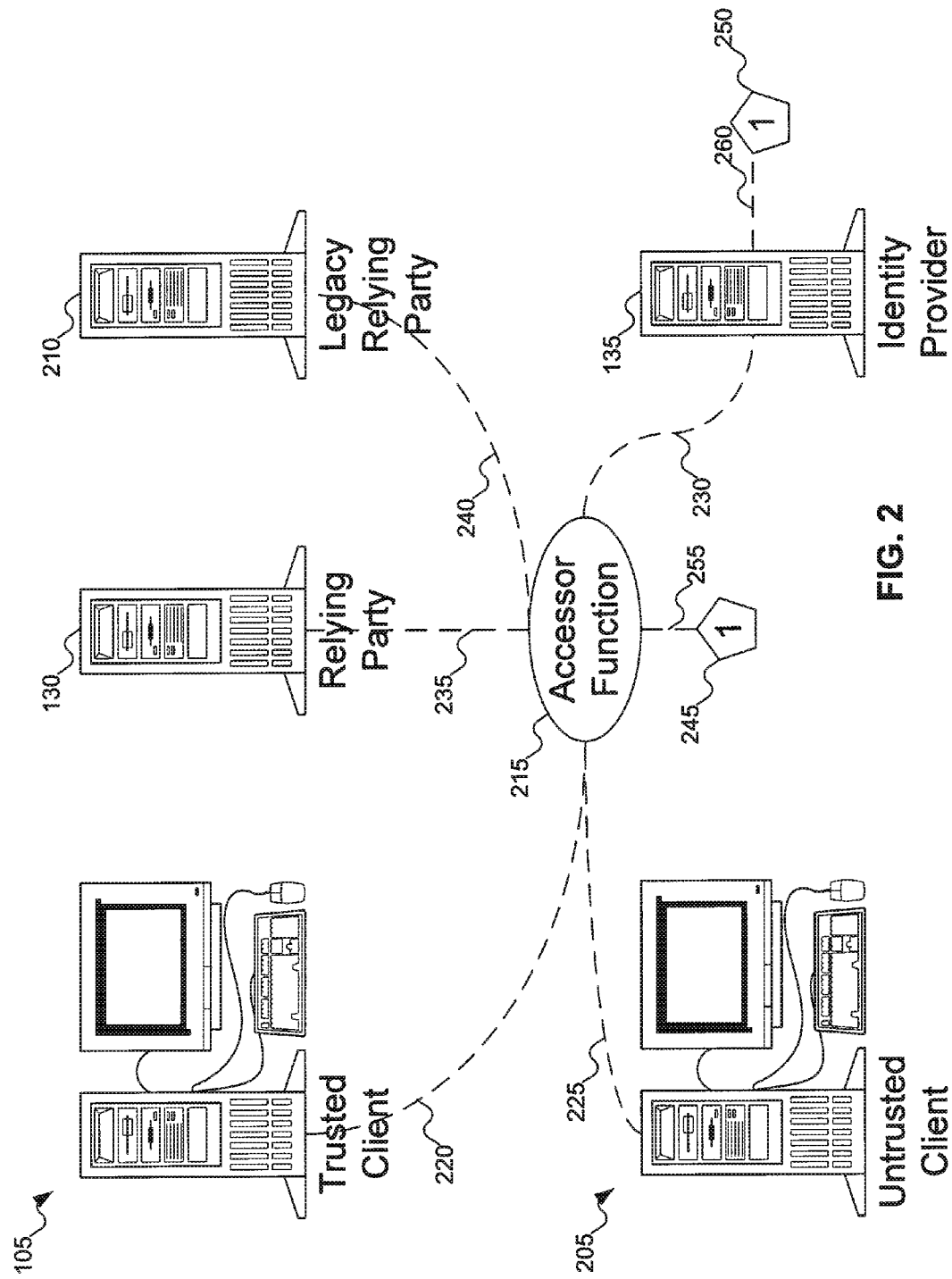
FIG. 2 shows a trusted client, an untrusted client, an identity provider, a relying party, and a legacy relying party communicating through an accessor function, in an embodiment of the invention.

Now that the problem—removing the assumption that client 105 is trustworthy—is understood, embodiments of the invention can be explained. In FIG. 2, both trusted client 105 and untrusted client 205 are shown communicating with relying parties. Trusted client 105 can be any trusted client, as known in the art. Untrusted client 205 represents a client whose security cannot be trusted: for example, untrusted client 205 might be vulnerable to key logging software, screen capture software, memory interrogation, or any other variety of attack that might expose the user's sensitive information to another. Untrusted client 205 might be, for example, a kiosk in a public place, or even a publicly-accessible computer, such as might be found in the library. Any machine whose security is uncertain or cannot otherwise be guaranteed can be considered to be an untrusted client.

A relying party can be relying party 130, a relying party that is capable of processing a security token issued in accordance with the information card system. The relying party can also be a legacy relying party, such as legacy relying party 210. Legacy relying party 210 represents a party with whom trusted client 105 or untrusted client 205 might wish to conduct a transaction, but does not process security tokens issued in accordance with the information card system. For example, legacy relying party 210 might represent a website that expects a user to provide a username and password to access a resource on the website, but does not request a security token from an information card system. Or, legacy relying party 210 might be a website that includes a form that can be filled out from data stored in information card. Or, legacy relying party 210 might be a machine that uses LDAP in order to authenticate credentials and retrieve attribute information; accessor function 215 can populate an LDAP store that can be used by this machine. A person skilled in the art will recognize other types of legacy relying parties, not normally designed to use information card systems, with which embodiments of the invention can be used.

As noted above, when a user uses untrusted client 205 to perform a transaction using the information card system, it is desirable to avoid any sensitive information be made available directly to untrusted client 205. To accomplish this aim, identity provider 135 can store not only the information cards managed by identity provider 135, but also personal information cards created by the user. As discussed above, personal information cards are cards that are self-asserting: the user is asserting the accuracy of the information in the personal information card, rather than some other authority, such as identity provider 135. That identity provider 135 stores personal information cards as well as managed information cards does not represent that identity provider 135 now asserts the information contained in the personal information cards; identity provider 135 is merely offering a service that allows for the use of personal information cards on machines such as untrusted client 205.

As the use of untrusted client 205 depends on identity provider 135 already storing the information cards (either personal or managed), the information cards need to be established before the user can use untrusted client 205. Since establishing information cards involves information about the user that should be kept secret, normally the user will create the information cards on trusted client 105, and then transfer the information cards to identity provider 135, after which the user can use the information cards to perform a transaction on untrusted client 205.

Facilitating communications between trusted client 105, untrusted client 205, relying party 130, legacy relying party 210, and identity provider 135 is accessor function 215. Most communications between trusted client 105 and/or untrusted client 205 on the one hand and identity provider 135, relying party 130, and/or legacy relying party 210 on the other hand pass through accessor function 215, with some exceptions to be discussed below. For example, trusted client 105 and untrusted client 205 communicate with accessor function 215 via lines of communication 220 and 225, respectively. Similarly, identity provider 135, relying party 130, and legacy relying party 210 communicate with accessor function via lines of communication 230, 235, and 240, respectively. (Not shown in FIG. 2 is a network connecting trusted client 105, untrusted client 205, accessor function 215, identity provider 135, relying party 130, and legacy relying party 210. A person skilled in the art will recognize that some network(s) connect these components, and that different networks and different network types can be used to connect these various components. For example, some components of FIG. 2 might be connected via wireline networks, where as other components might be connected via wireless networks.)

A person skilled in the art might recognize that trusted client 105 can communicate directly with relying party 130 and identity provider 135 without the intervention of accessor function 215. Nevertheless, there is an advantage to including accessor function 215 in the system shown in FIG. 2. Specifically, by including accessor function 215 in the system shown in FIG. 2, legacy relying party 210 can use the information card system with trusted client 105, a functionality that would not be available without accessor function 215.

Also shown in FIG. 2 are out-of-band modes 245 and 250, coupled to accessor function 215 via line of communication 255 and identity provider 135 via line of communication 260, respectively. Out-of-band modes 245 and 250 enable functions that, for one reason or another, should not be carried out across the network connecting trusted client 105 and/or untrusted client 205 with accessor function 215 and identity provider 135. For example, accessor function 215 or identity provider 135 might request a user of untrusted client 205 to authenticate himself: for example, by submitting a username and password combination. If such information were input into untrusted client 205, this information, which is sensitive to the user, might be captured by some software residing on untrusted client 205. Thus, instead of the user inputting the information into untrusted client 205, thereby potentially leaking sensitive information, the user can utilize an out-of-band authentication mode, such as out of band mode 245 or 250, to perform the authentication step, without potentially leaking sensitive information at untrusted client 205. Out-of-band modes 245 and 250 can be any out-of-band mode that does not utilize the network connecting untrusted client 205 with the respective components of the system. For example, out-of-band modes 245 and 250 can utilize a cellular telephone connection. When out-of-band authentication is needed, the user's cellular telephone can be rung, and the user asked to input an authentication code. If it turns out that the user's identity has been spoofed (at least to the point of requiring authentication), out-of-band authentication can detect that possibility, protecting the user's identity. On the other hand, if the user is in fact using the information card system, then the user can input the authentication code. Once the user is properly authenticated, the system can proceed as normal.

As discussed above, legacy relying party 210 represents a relying party that is not capable of using the information card system. Accessor function 215 can detect that legacy relying party 210 is a legacy relying party, and act as a proxy for legacy relying party 210 in using the information card system. Co-pending U.S. patent application Ser. No. 12/019,104, titled "PROCESSING HTML EXTENSIONS TO ENABLE SUPPORT OF INFORMATION CARDS BY A RELYING PARTY", filed Jan. 24, 2008, and incorporated by reference herein describes how a trusted client can use the information card system on behalf of a legacy relying party. A person skilled in the art will recognize how accessor function can be adapted to provide a similar functionality on behalf of a legacy relying party, separating this functionality from the trusted client.

Figure 3:
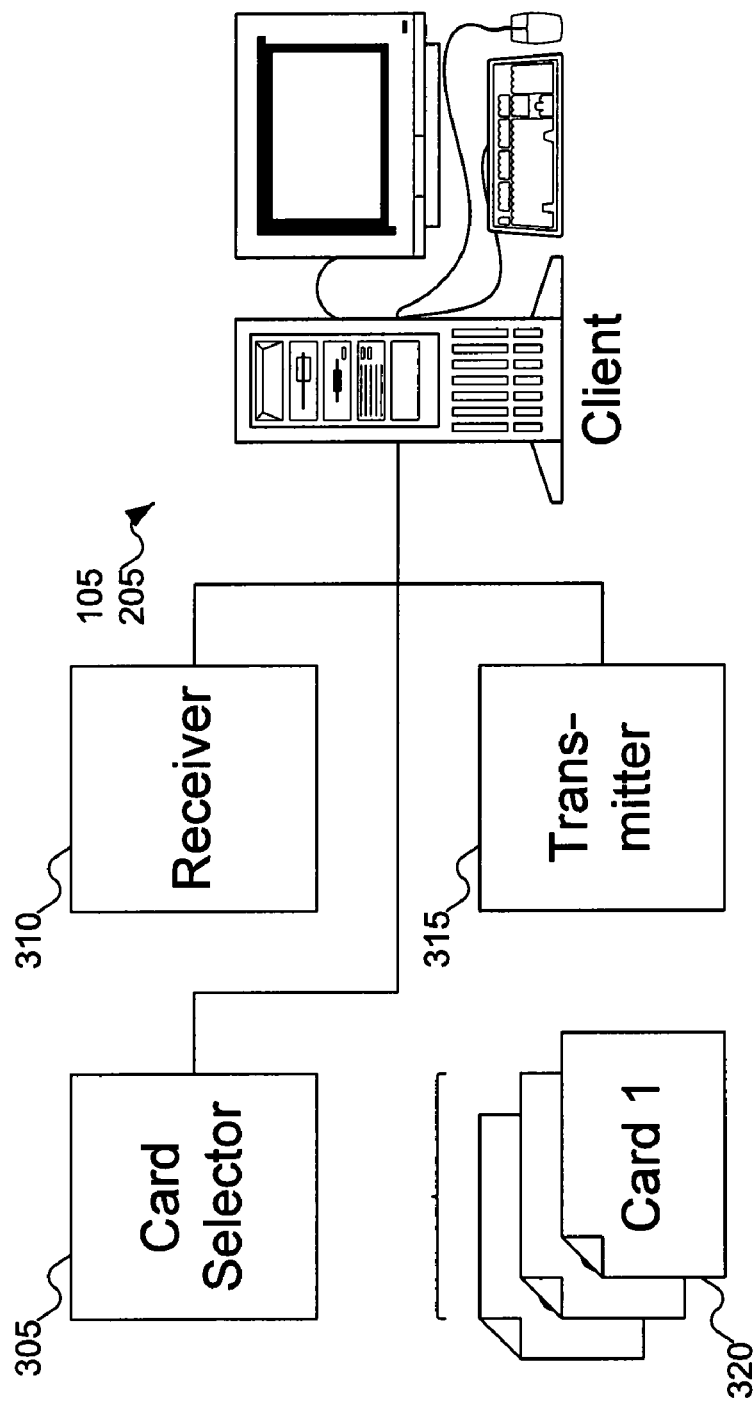
FIG. 3 shows the clients of FIG. 2 equipped to interact with the accessor function of FIG. 2.

FIG. 3 shows the clients of FIG. 2 equipped to interact with the accessor function of FIG. 2. In FIG. 3, clients 105 and 205 are shown as including card selector 305, receiver 310, and transmitter 315. Card selector 305 enables the user of the client to select the desired information card to use in a particular transaction. Receiver 310 and transmitter 315 enable communications to and from the client.

FIG. 3 also shows clients 105 and 205 as including information cards, such as information card 320. These information cards are displayed in card selector 305, permitting the user to select the desired information cards used for the current transaction. However, the information cards are not necessarily stored on the client. As discussed above with reference to FIGS. 1 and 2, it is not desirable to store personal information cards on untrusted client 205, as the information contained on the personal information cards might be sensitive to the user and might be captured by some software resident on untrusted client 205. Instead, clients 105 and 205 can request a list of information cards that are available for use at the client. This is discussed further with reference to FIGS. 4 and 5 below.

Figure 4:
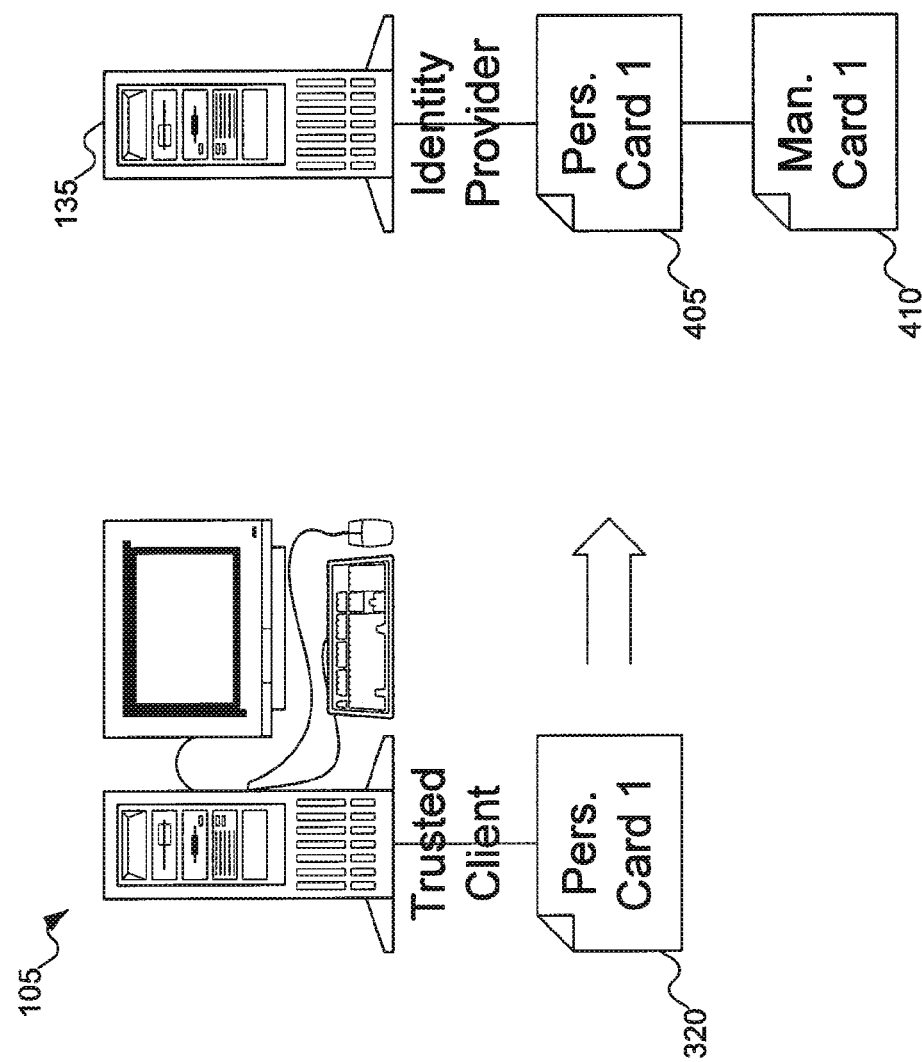
FIG. 4 shows the trusted client of FIG. 2 transmitting a personal information card to the identity provider of FIG. 2 for management on behalf of the user.

FIG. 4 shows the trusted client of FIG. 2 transmitting a personal information card to the identity provider of FIG. 2 for management on behalf of the user. In FIG. 4, trusted client 105 is shown transmitting personal information card 320 to identity provider 135. As trusted client 105 is, of course, trusted, trusted client 105 could use personal information card 320 without needing identity provider 135 to "manage" personal information card 320 (shown coupled to identity provider 135 as personal information card 405) on its behalf. However, by having identity provider 135 "manage" personal information card 405 (along with managed information card 410), the system enables the use of personal information card 405 at any client. In fact, having identity provider 135 "manage" personal information card 405 on behalf of trusted client 105 not only enables the use of personal information card 405 at untrusted clients, but it also enables the user to utilize personal information card 405 at other trusted clients on which personal information card 320 has not been installed. Thus, the system enables not only the use of untrusted clients with the information card system, but it also enables the user to have a "virtual wallet" that can be used at any client, trusted or not.

When the user desires to utilize the information card system from a client (trusted or not), the client can request from identity provider 135 images of any information cards resident on identity provider 135 that belong to the user. The images of the information cards of themselves are not sensitive information, and can be transmitted across any networks, even to an untrusted client. The images of the information cards can be graphical images, such as bitmaps, GIFs, JPGs, or any other desired graphical form, which can be displayed by the client. The images of the information cards can also be structured in a "textual form" that can be displayed by the client. For example, the images can be structured as HTML, XML, or other text-based formats; the client can then process the text-based format and display information about the information card to the user. In either case, the image normally does not include any secret information (which, if made available to an untrusted client, could be captured and used against the user). The user, of course, knows what information is represented by the image of each information card, and therefore can select an appropriate information card to use in the current transaction.

At this point, it is worth noting that the advantage of the virtualization of the user's "wallet" can come at a price. For example, as discussed above, the information card system can use data known about the information cards installed on the system, in conjunction with the security policy from the relying party, to identify installed information cards that can satisfy the security policy. In some embodiments of this invention, the identity provider can transmit to the client only images of information cards that can satisfy the security policy. In such embodiments of the invention, the user can select any information card whose image is shown, in the knowledge that the information card can satisfy the security policy of the relying party. In other embodiments of the invention, however, the identity provider can transmit images of all information cards available at the identity provider, without identifying which information cards can satisfy the security policy of the relying party. In these alternative embodiments of the invention, the burden is on the user to remember which information card might satisfy the security policy of the relying party.

In FIGS. 2 and 4, only one identity provider is shown. However, a person skilled in the art will recognize that multiple identity providers can exist, and can be used in conjunction with embodiments of the invention. For example, one identity provider can operate as a proxy for another identity provider. This proxy service can operate for any desired objective: for example, to authenticate the user to the second identity provider, or to obtain a list of information cards available at the second identity provider.

Figure 5:
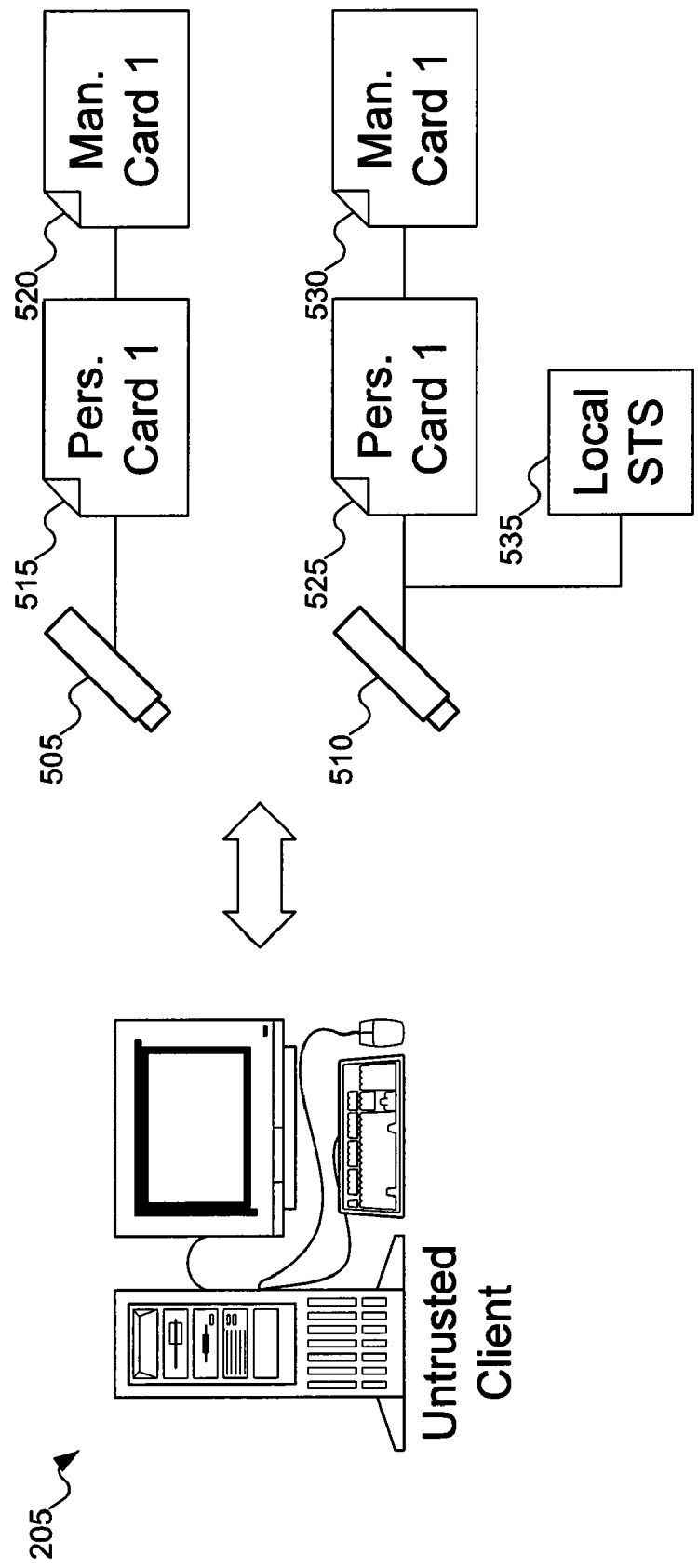
FIG. 5 shows the untrusted client of FIG. 2 capable of communicating with a dumb USB device or a smart USB device.

FIG. 5 shows the untrusted client of FIG. 2 capable of communicating with a dumb USB device or a smart USB device. In FIG. 5, untrusted client 205 is shown communicating variously with dumb USB device 505 or smart USB device 510. While the discussion of FIG. 5 focuses on the storage device as a USB device, a person skilled in the art will recognize that the USB device can be replaced with any appropriate alternative storage form.

Dumb USB device 505 represents a dumb storage device: that is, a storage device that simply stores data, without any inherent security or processing capability. As it lacks any security or processing capabilities, dumb USB device 505 is not considered any more "secure" than untrusted client 205 is. Thus, dumb USB device 505 normally would not store any sensitive information. Dumb USB device 505 is shown as storing personal information card 515 and managed information card 520. These are not true information cards stored on dumb USB device 505; rather, they are merely images representing information cards that can be accessed from some other source, such as an identity provider. When the card selector on untrusted client 205 is invoked, it can detect the presence of dumb USB device 505, and retrieve from the storage therein the images of personal information card 515 and managed information card 520. The user can therefore bring with him on dumb USB device 505 images of information cards the user wants to carry with him, even though the cards themselves remain stored securely at the identity provider.

In contrast, when untrusted client 205 is coupled to smart USB device 510, things can operate a little differently. Because smart USB device 510 is "smart", smart USB device 510 can securely store information cards, such as personal information card 525 and managed information card 530. In addition, smart USB device 510 can include local secure token service 535. Local secure token service 535 is a trusted secure token service, capable of generating (from within smart USB device 510) a security token responsive to a selected information card. (This of course assumes that the data needed to generate the security token is available within smart USB device 510. For example, local secure token service 535 cannot generate a security token based on managed information card 530, as the data that comprises managed information card 530 is not stored on smart USB device 510, but rather on identity provider 135.) Because smart USB device 510 is secure, and because local secure token service 535 is trusted, local secure token service 535 can generate a security token without any sensitive information being compromised, even though smart USB device 510 is coupled to untrusted client 205, which itself might be compromised.

A comparison with co-pending U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, to co-pending U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, to co-pending U.S. patent application Ser. No. 11/843,640, titled "FRAMEWORK AND TECHNOLOGY TO ENABLE THE PORTABILITY OF INFORMATION CARDS", filed Aug. 22, 2007, all of which are herein incorporated by reference, might now be useful. These related applications describe, among other concepts, portable information cards. For example, if the client is coupled to a USB device storing the portable information cards, the client can access the information cards from this USB device. The same is true of any other pluggable card store. But if the client is not trusted, the use of portable information cards as described in these related applications does not avoid the potential revelation of sensitive information on the untrusted client: once the untrusted client has access to the information cards (particularly personal information cards) from the pluggable card store, the sensitive information stored in those cards is vulnerable. In contrast, with remotable information cards, the sensitive information in card stores can be protected.

At this point, it should be clear as to how a client can obtain a list of available information cards. The client can query the identity provider (possibly via the accessor function) for a list of information cards available at the identity provider. Or, the client can access available information cards (either directly available or just images representing information cards available at another source, such as an identity provider) from a locally-coupled data store, such as a USB device. A person skilled in the art will also recognize that a client can generate a list of available information cards by combining multiple sources: for example, both querying an identity provider and accessing a local USB device.

Figure 6A:
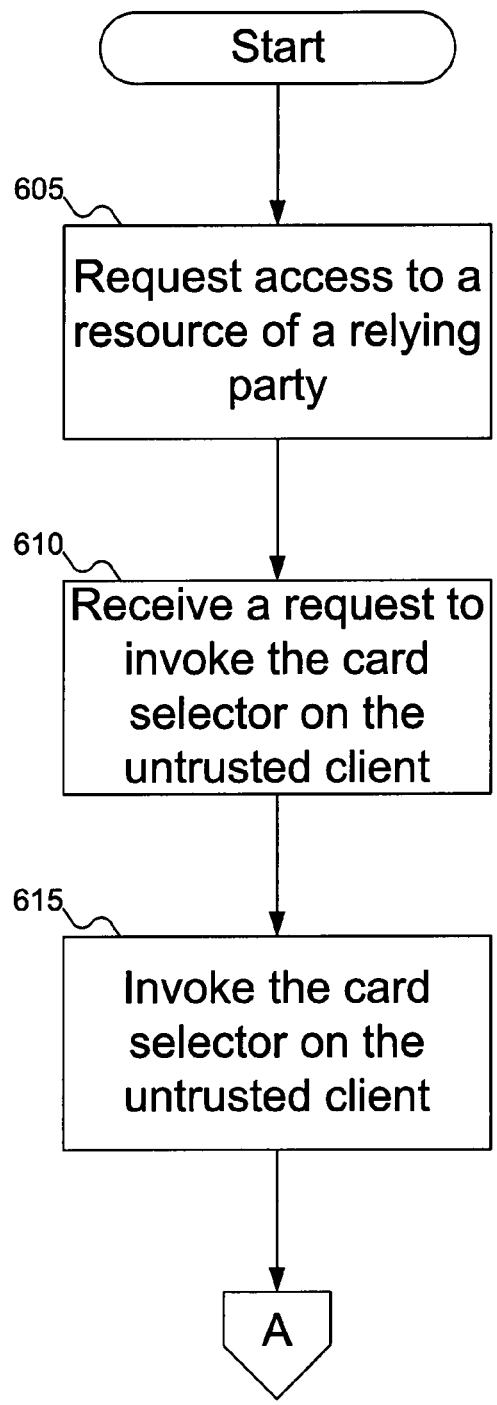
FIGS. 6A-6C show a flowchart of a procedure for the clients of FIG. 2 to interact with the accessor function in the information card system.
Figure 6B:
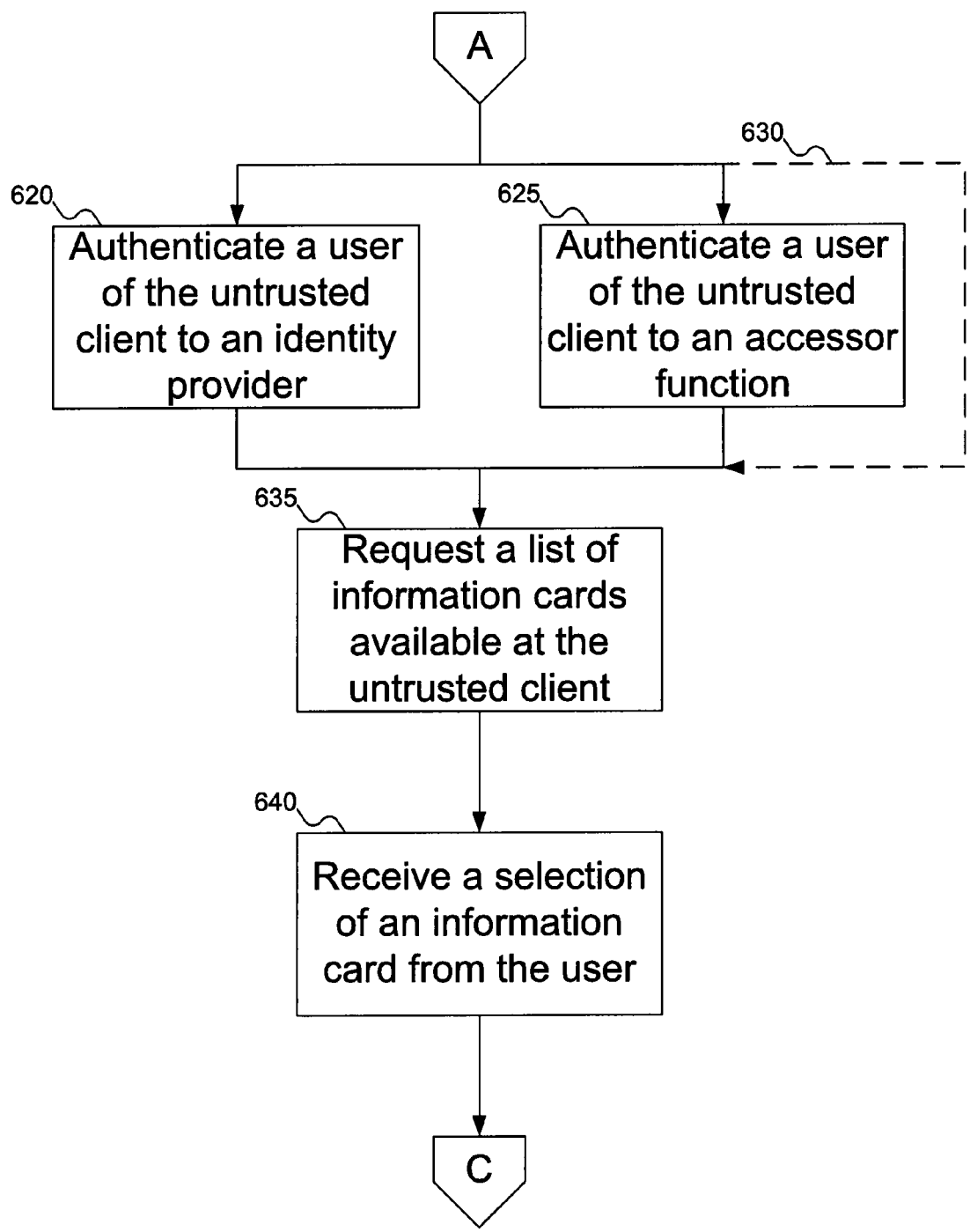
Figure 6C:
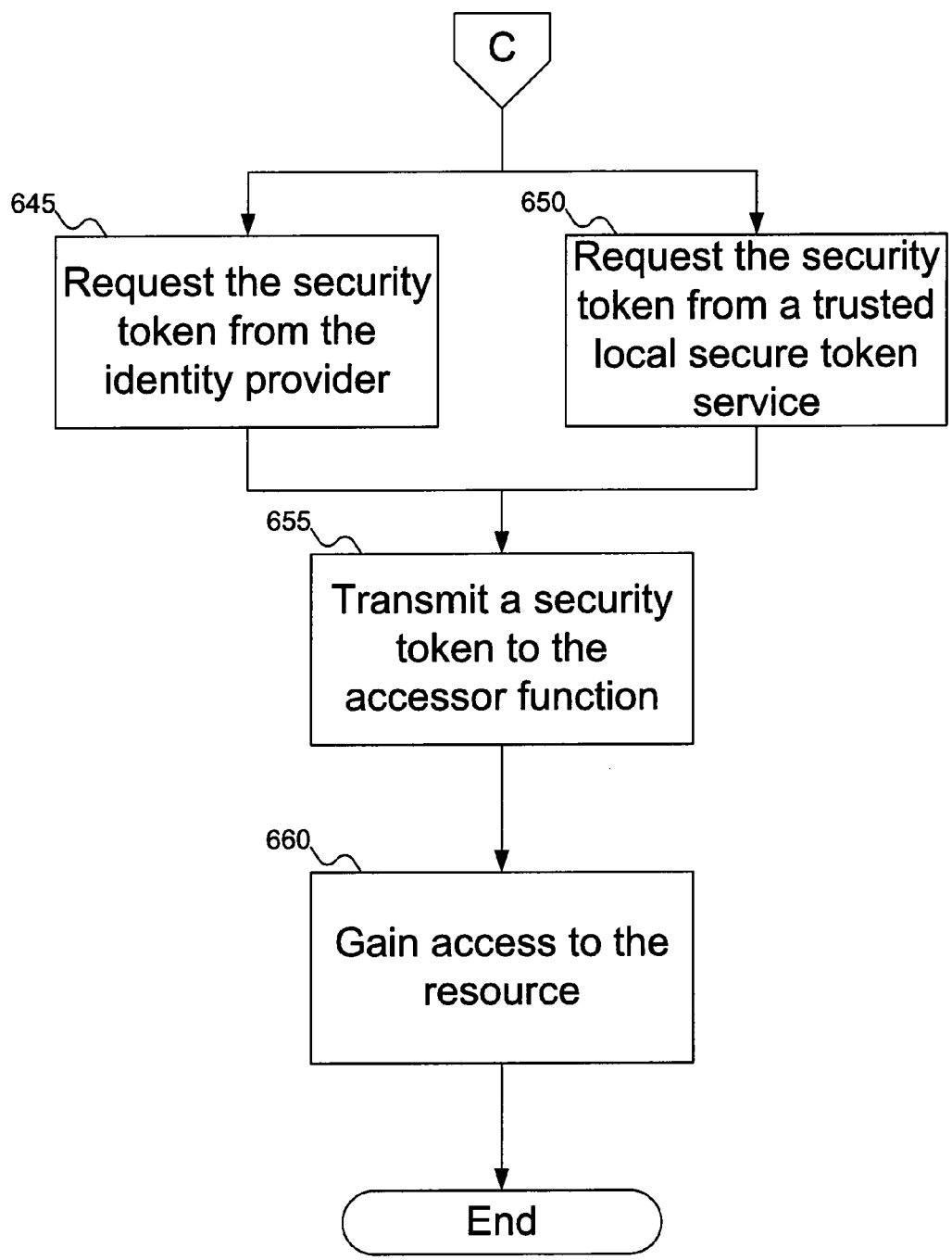

FIGS. 6A-6C show a flowchart of a procedure for the clients of FIG. 2 to interact with the accessor function in the information card system. In FIG. 6A, at block 605, the client, trusted or untrusted, requests access to a resource of a relying party. At block 610, the client receives a request to invoke a card selector. As discussed above, this request to invoke the card selector is typically performed by the accessor function, which can act as a proxy for the relying party; can be the destination of the client's request, as redirected; or can be the direct destination of the client's request. At block 615, the card selector is invoked on the client.

At some point, either the accessor function or an identity provider might request that the user authenticate himself to the system. At block 620 (FIG. 6B), the user authenticates himself to the identity provider; at block 625, the user authenticates himself to the accessor function. Typically, the user does not need to authenticate himself to both the accessor function and the identity provider. If the user does not need to authenticate himself (for example if the user has previously authenticated himself this session, or if the system does not request authentication), the authentication blocks can be omitted, as shown by dashed line 630.

Assuming authentication is satisfied (if required), at block 635 the client requests a list of available information cards. As discussed above, this can involve querying an identity provider for list of the information cards available at that identity provider, accessing a local data store, such as a USB device, or some other means. At block 640, the client receives the users selected information card.

At this point, once the information card has been selected, the accessor function needs to receive a security token. As discussed above, with reference to FIGS. 2 and 5, the security token can be generated by an identity provider or, if a trusted local secure token service is available (for example on a smart USB device), the security token can be generated in the local secure token service. At block 645, the client can request an identity provider to generate the security token; alternatively, at block 650, the client can request the trusted local secure token service to generate the security token. Either way, once the client has the security token, at block 655, the client transmits a security token to the accessor function, and at block 660, the client gains access to the resource.

A person skilled in the art will recognize that normal operation of the information card system has all information flowing through the client: no information normally bypasses the client. Thus, in normal operation, the security token as generated by the identity provider passes through the client before it is delivered to the relying party (in embodiments of the invention, via the accessor function). However, a person skilled in the art will also recognize that, if the security token is considered "sensitive information" (in that the security token represents, usually in encrypted form, data from an information card), the security token can be transmitted from the identity provider directly to the accessor function, bypassing the client. In this embodiment of the invention, it is helpful for the identity provider to also transmit a message to the client, alerting the client that the security token was transmitted directly to the accessor function. In this way, the client is kept aware of the fact that the security token was transmitted to the accessor function, even though the security token did not pass through the client on the way to the accessor function.

As discussed above with reference to block 635, the client can determine a list of available information cards from a number of different sources. FIG. 7 shows a flowchart of a procedure for the clients of FIG. 2 can construct a list of information cards available for use at the client. At block 705, the client can request a list of available information cards from an identity provider, and at block 710, the client can receive the list of information cards available from the identity provider. As discussed above with reference to FIG. 2, one identity provider can act as a proxy for another identity provider. In such an embodiment of the invention, the request for the list of information cards available at the first identity provider can include the request for the list of information cards available at the other identity provider(s) by proxy.

Alternatively, at block 715, the client can request a list of information cards available to it from the accessor function, and at block 720, the client can receive a list of information cards available from the accessor function. In this embodiment of the invention, the accessor function is essentially acting as a proxy for the identity provider(s).

In another alternative, at block 725, the client can access a list of available information cards from a local data store. As discussed above with reference to FIG. 5, this local data store can be, for example, a USB device.

Figure 8:
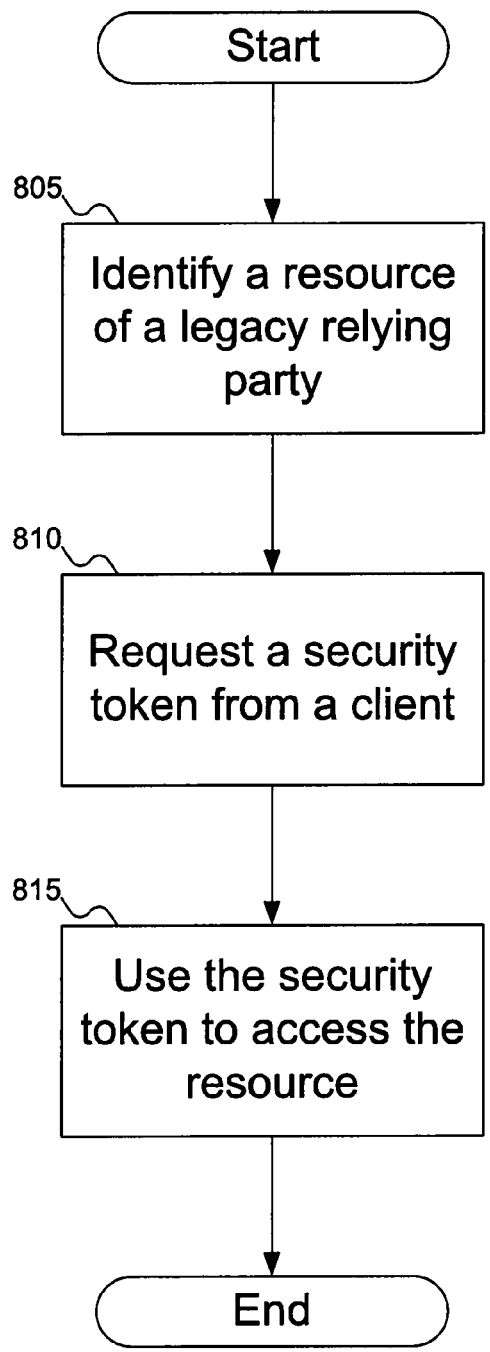
FIG. 8 shows a flowchart of a procedure for the accessor function of FIG. 2 to detect a legacy relying party and invoke the information card system on behalf of the legacy relying party.

FIG. 8 shows a flowchart of a procedure for the accessor function of FIG. 2 to detect a legacy relying party and invoke the information card system on behalf of the legacy relying party. At block 805, the accessor function identifies a request to access a resource of a legacy relying party. As discussed above with reference to FIG. 2, such resources can include an authentication request of a legacy relying party, a form of the legacy relying party to be filled out, or an LDAP store that needs to be populated, among other possibilities. Further, this request can be made by either a trusted client or an untrusted client, depending on the situation. (If the request is made by an untrusted client, then the accessor function is fulfilling two roles: that of enabling the remote use of information cards at an untrusted client, and that of enabling the use of information cards with legacy relying parties that are not designed to use a security token.) At block 810, the accessor function requests a security token from a client. Finally, at block 815, accessor function uses the security token to access the resource of the legacy relying party. Further details as to how the accessor function can use the security token to access the resource of the legacy relying party are shown with reference to FIG. 9 below.

Figure 9:
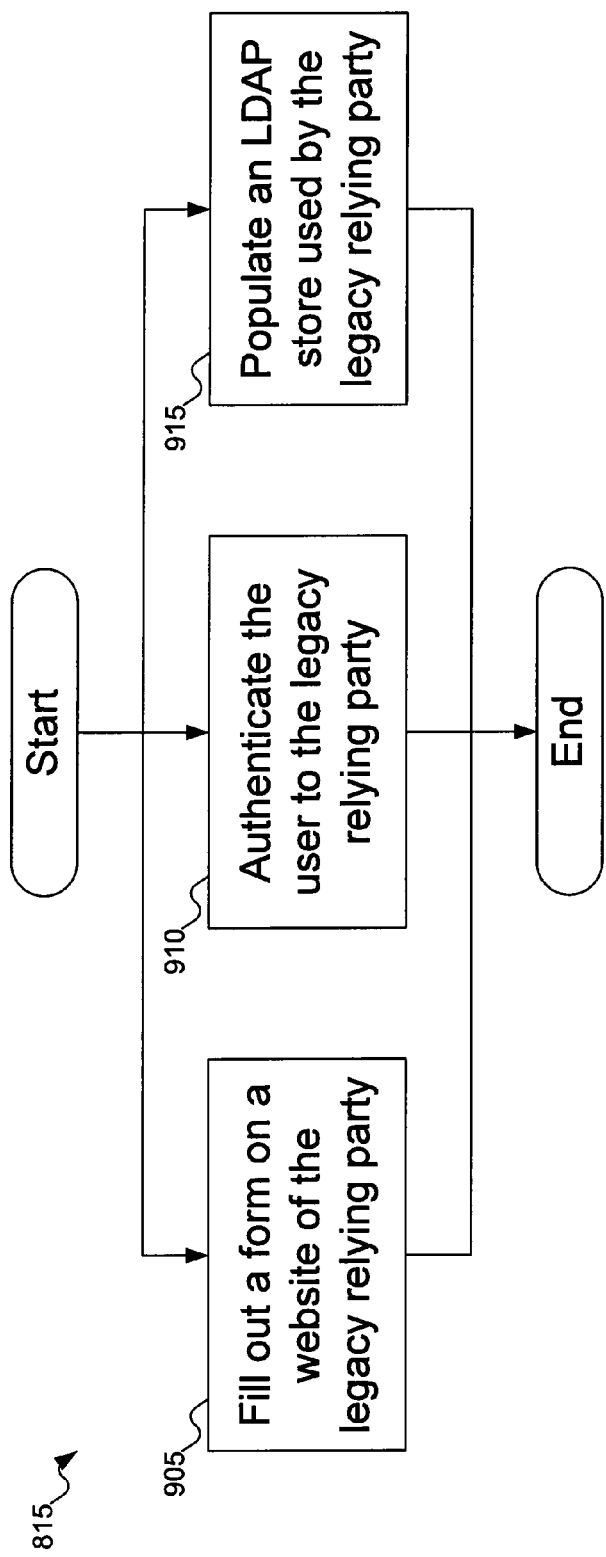
FIG. 9 shows a flowchart of a procedure for ways in which the accessor function of FIG. 2 can use data from an information card on behalf of the legacy relying party.

FIG. 9 shows a flowchart of a procedure for ways in which the accessor function of FIG. 2 can use data from an information card on behalf of the legacy relying party. At block 905, the accessor function can use the security token to fill out a form on the website of the legacy relying party. At block 910, the accessor function can use the security token to authenticate the user to the legacy relying party. And at block 915, the accessor function and use the security token to populate an LDAP store on behalf of the legacy relying party.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. A system, comprising:
    an untrusted client, wherein the untrusted client is a machine whose security cannot be trusted;
    an identity provider operative to receive a selection of an information card from a user of the untrusted client and to issue a security token generated using the selected information card;
    a relying party to authenticate said user of the untrusted client using said security token and to allow access to a resource on the relying party; and
    an accessor function to interface between the untrusted client and the relying party, where the accessor function is operative to invoke a card selector on the untrusted client on behalf of the relying party and the accessor function is on a separate machine from the untrusted client, the identity provider, and the relying party.

2. A system according to claim 1, wherein the relying party is a legacy relying party.

3. A system according to claim 1, wherein the identity provider is operative to require a user of the untrusted client to authenticate himself before the identity provider releases any sensitive information.

4. A system according to claim 3, wherein the identity provider is further operative to require said user of the untrusted client to authenticate himself using an out-of-band authentication mode before the identity provider releases any sensitive information.

5. A system according to claim 1, wherein the accessor function is operative to require a user of the untrusted client to authenticate himself to the accessor function.

6. A system according to claim 5, wherein the accessor function is further operative to require a user of the untrusted client to authenticate himself to the accessor function using an out-of-band authentication mode.

7. A system according to claim 1, wherein the identity provider is operative to transmit to the untrusted client a security token generated using said selected information card.

8. A system according to claim 7, wherein:
said selected information card is a personal information card; and
the identity provider is further operative to manage said personal information card on behalf of a user of the untrusted client.

9. A system according to claim 8, wherein the identity provider is further operative to transmit an image of at least one information card to the untrusted client.

10. A system according to claim 7, wherein the untrusted client is coupled to a data store to store a reference to said selected information card.

11. A system according to claim 1, further comprising a secure data store coupled to the untrusted client to securely store a selected information card.

12. A method, comprising:
requesting access to a resource of a relying party from an untrusted client;
receiving a request on the untrusted client to invoke a card selector from an accessor function, wherein the accessor function interfaces between the untrusted client and the relying party, and the accessor function is on a separate machine from the untrusted client, an identity provider, and the relying party;
invoking the card selector on the untrusted client by the accessor function;
authenticating a user of the untrusted client at the identity provider;
transmitting from the untrusted client to the identity provider a selection of an information card from the user of the untrusted client via the card selector;
receiving at the untrusted client a security token from the identity provider, the security token generated from the selected information card;
transmitting the security token from the untrusted client to the relying party via the accessor function; and
gaining access to the resource of the relying party by the untrusted client after authentication of the user by the relying party using the security token.

13. A method according to claim 12, wherein authenticating the user of the untrusted client to an identity provider includes authenticating the user of the untrusted client to the identity provider using an out-of-band authentication mode.

14. A method according to claim 12, wherein authenticating a user of the untrusted client at the identity provider includes authenticating the user of the untrusted client to the accessor function.

15. A method according to claim 14, wherein authenticating the user of the untrusted client to the accessor function includes authenticating the user of the untrusted client to the accessor function using an out-of-band authentication mode.

16. A method according to claim 12, further comprising requesting a list of information cards available at the untrusted client.

17. A method according to claim 16, wherein requesting a list of information cards available at the untrusted client includes requesting the list of information cards available at the untrusted client from the identity provider.

18. A method according to claim 17, wherein requesting the list of information cards available at the untrusted client from the identity provider includes:
requesting from the accessor function the list of information cards available at the untrusted client from the identity provider; and
receiving from the accessor function the list of information cards available at the untrusted client from the identity provider.

19. A method according to claim 17, wherein requesting the list of information cards available at the untrusted client from the identity provider includes requesting the list of information cards available at the untrusted client from a the identity provider, the list of information cards including a personal information card managed by the identity provider.

20. A method according to claim 12, wherein transmitting from the untrusted client to the identity provider a selection of an information card from the user of the untrusted client via the card selector includes requesting the security token from the identity provider.

21. A method according to claim 16, wherein requesting a list of information cards available at the untrusted client includes accessing the list of information cards available at the untrusted client from a data store coupled to the untrusted client.

22. A method according to claim 21, further comprising requesting the security token from the identity provider.

* * * * *